United States Patent [19]

Kurakake

[11] Patent Number: 4,734,689

[45] Date of Patent: Mar. 29, 1988

[54] DISPLAY APPARATUS WHICH CAN SCROLL DISPLAYED DATA WITH REGARD TO CURSOR POSITION

[75] Inventor: Shigeo Kurakake, Hanno, Japan

[73] Assignee: Casio Computer Co., Ltd., Tokyo, Japan

[21] Appl. No.: 833,055

[22] Filed: Feb. 24, 1986

[30] Foreign Application Priority Data

Mar. 7, 1985 [JP] Japan .................................. 60-45642
Apr. 30, 1985 [JP] Japan .................................. 60-92423

[51] Int. Cl.⁴ .............................................. G09G 1/16
[52] U.S. Cl. .................................... 340/726; 340/709; 340/721
[58] Field of Search ............... 340/726, 724, 723, 709, 340/721

[56] References Cited

U.S. PATENT DOCUMENTS 4,495,490 1/1985 Hopper et al. ...................... 340/723
4,586,035 4/1986 Baker et al. .......................... 340/706

FOREIGN PATENT DOCUMENTS 052754 6/1982 European Pat. Off. .
0108520 5/1984 European Pat. Off. ............. 340/709

Primary Examiner—Marshall M. Curtis
Assistant Examiner—Mahmoud Fatahi-Yar
Attorney, Agent, or Firm—Frishauf, Holtz, Goodman & Woodward

[57] ABSTRACT

A display apparatus includes a document memory for storing data, a display section for displaying the data stored in a desired storage area of the document memory on a screen, and a scroll controller for designating data to be displayed on the display section and designating a cursor position to be displayed. When a cursor is located outside of a predetermined range on the screen, if a cursor-up or-down movement command is input, the displayed data is scrolled without moving the cursor position. When the cursor is located in the predetermined range on the screen, if the cursor-up or - down movement command is input, the cursor position changes in accordance with the command, and the displayed data is not scrolled. Even when the cursor is located outside of the predetermined range on the screen, if a storage area to be displayed by scrolling is not present in the document memory, or even if the storage area is present, if data to be displayed is not present on the screen, the cursor is displayed just as when located in the predetermined range.

7 Claims, 11 Drawing Figures

DISPLAY APPARATUS WHICH CAN SCROLL DISPLAYED DATA WITH REGARD TO CURSOR POSITION

BACKGROUND OF THE INVENTION

The present invention relates to displayed data scrolling and cursor position control in, e.g., a Japanese word processor and an electronic typewriter and, more particularly, to a display apparatus which can scroll displayed data with regard to a cursor position on a display screen.

Display apparatuses are often used to take advantage of visual observation of required information. A wordprocessor is one of various applications for the display apparatus. In a wordprocessor, a previously input document is read out and displayed on a screen, to allow correction to it. This, as well as a printing function, is an important function of the wordprocessor. However, it is difficult to display a one-page document (e.g., corresponding to A4-size paper) on a single screen because of hardware limitations and the like. For this reason, only a portion of the one-page document data is displayed on a screen, and is changed so as to display the entire page as needed. More specifically, the other portion of the one-page document data appears line by line when each line of the one-page document data displayed scrolls upward or downward.

In order to correct the document, a cursor is moved to a character to be corrected. In a conventional cursor control method, when a character to be corrected is not yet displayed, after a cursor for indicating a character position to be corrected is moved to an upper or lower end of the current screen, a cursor movement key is consecutively operated to scroll the screen. For example, the cursor is moved to a lower end of the screen by operating a cursor down-movement key, and when this key is further operated, a portion under the currently displayed portion of the document appears from the lower end of the screen by scrolling. The same scrolling occurs when a cursor up-movement key is operated after the cursor is moved to a top end of the screen. After a required document line has scrolled to a central portion of the screen upon successive operations of the cursor movement key, the cursor must be returned to the character position of interest. For this reason, in the conventional method, although displayed data is left unmoved and can be seen with ease, a cumbersome operation is required in practical use.

A means for eliminating the above problem is disclosed in West German (DE) Patent Application No. P2915673.8 and Japanese Patent Disclosure No. 55-140935. According to these disclosures, a cursor position is fixed at a given position on a screen even when a display movement key is operated or when characters are input, and only displayed data scrolls. In this method, however, since the screen scrolls continuously each time the movement key is operated, one cannot easily see the displayed data.

Accordingly, a display apparatus is desired, so that after desired data is displayed in the center region of the screen by scrolling, it can be fixed on the screen and the cursor can be moved elsewhere to input new data.

SUMMARY OF THE INVENTION

The present invention has been made in consideration of the above situation, and has as its object to provide a display apparatus which, with regard to a display position of the cursor on the screen, can scroll only the screen while a cursor is fixed at a central position on the screen which is easy to see, and can also move a display position of the cursor while displayed data is fixed when a cursor movement key is operated, so that a document line of interest is scrolled near the center of the screen, and immediately thereafter, can be corrected.

In order to achieve the above object, there is provided a display apparatus which can scroll displayed data with regard to a cursor position, comprising:

storage means for storing data and/or information associated therewith;

display means displaying the data and/or the information associated therewith on a display screen when data for a specified storage area of the storage means and/or information associated therewith is input, and for displaying a cursor on the display screen in accordance with a designated display position;

access means storing the input data in the storage means at an address corresponding to the displayed data at a cursor display position when data to be displayed is input, and for reading out the data and/or the information associated therewith from the designated storage area to output the readout data to the display means; and display scroll control means for designating the storage area such that the data and/or the information associated therewith is scrolled by a predetermined distance in a direction opposite to the direction indicated by the command without the cursor being moved and for designating the cursor display position such that the cursor display position is moved in the direction indicated by the command over the predetermined distance without scrolling, depending on the location in the storage means corresponding to the cursor display position when a cursor movement command is input.

According to the present invention, the screen can scroll while a cursor is located at a position which is easy to see, and after a document line of interest is scrolled to that position, the document can be immediately corrected from the current cursor position.

BRIEF DESCRIPTION OF THE DRAWINGS

Drawings showing an embodiment of a display apparatus for scrolling displayed data regarding a cursor position on a screen will be described hereinafter.

DETAILED DESCRIPTION OF THE INVENTION

An embodiment of the present invention will be described with reference to the accompanying drawings.

Figure 1:
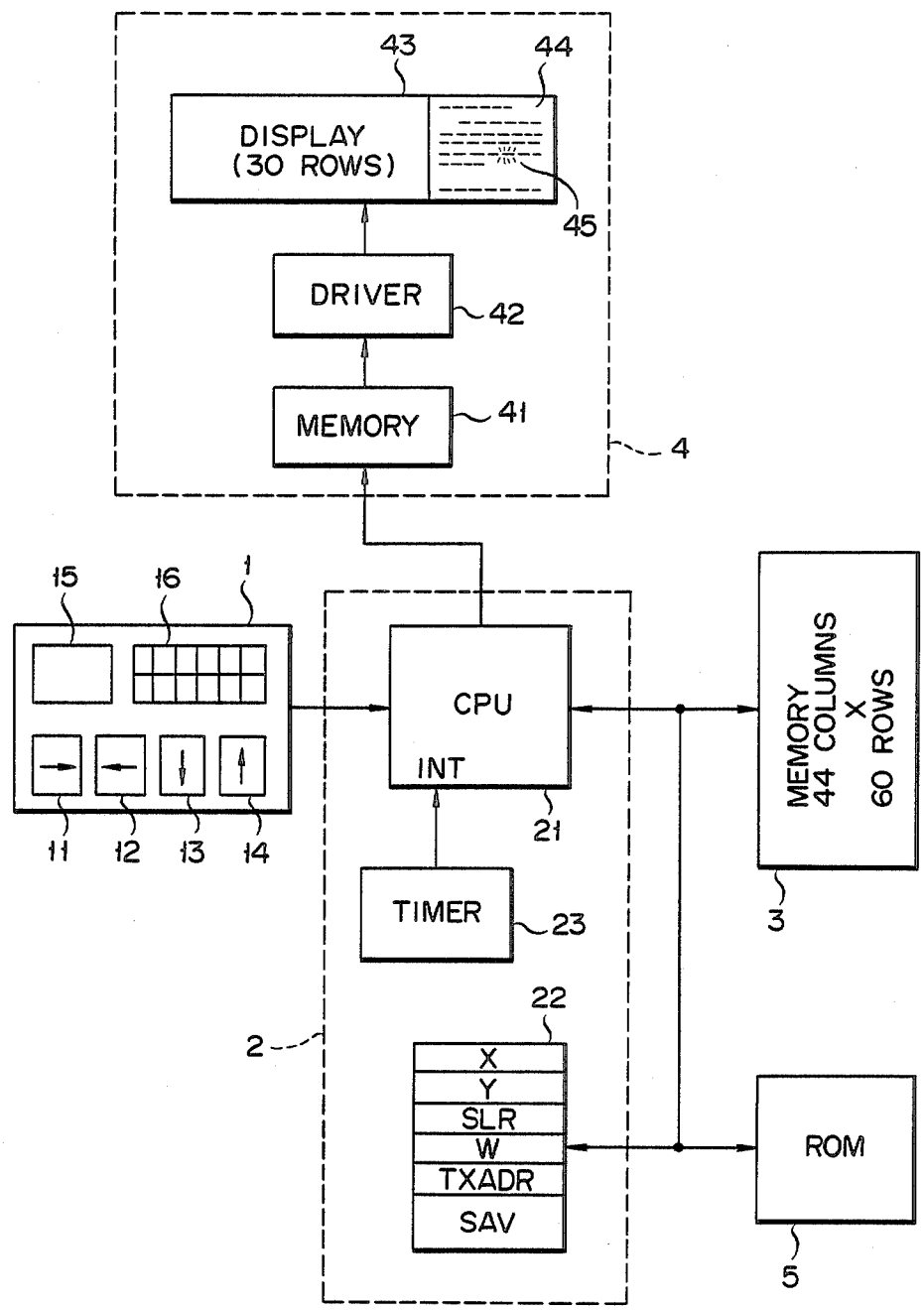
FIG. 1 is a block diagram of a display control apparatus according to an embodiment of the present invention.

A display apparatus according to an embodiment of the present invention will first be described with reference to FIG. 1. The display apparatus comprises key input section 1, display scroll controller 2, document memory 3, display section 4, and language conversion ROM 5. Key input section 1 comprises cursor-right movement key 11, cursor-left movement key 12, cursor-down movement key 13, and cursor-up movement key 14, which are associated with cursor movement or displayed data scrolling. In addition, layout display key 15 for enabling a reduction layout display showing a data storage state in memory 3, and character input keys 16 for inputting characters and symbols, are included in section 1. Document memory 3 is a RAM which can store input character data (e.g., alphanumeric characters and symbols) in the input order and has a data capacity of 2,640 characters of document data.

Display controller 2 comprises CPU 21, timer 23 (which is not related directly to the operation of the apparatus in this embodiment), and register group 22. Register group 22 comprises X-direction cursor register X which indicates a column position of the cursor in a column direction of the screen and takes a value varying between 1 to 44, Y-direction cursor register Y, which indicates not the cursor position on the screen but a line position of a document line of interest in memory 3 in the row direction and takes a value varying between 1 to 60, register SLR which indicates the display starting line position of document data in memory 3 in the reduction layout display mode and takes a value varying between 1 to 31, work register W used during cursor movement or screen scrolling, and save register SAV for saving various variables during calculating operations of CPU 21. Save register SAV is not related directly to the operation of the apparatus in this embodiment, and a detailed description thereof is omitted.

Display section 4 is connected to CPU 21, and comprises display memory 41 for storing display data from memory 3, driver 42, connected to memory 41, for driving so as to display data stored therein, and display screen 43, connected to driver 42, for displaying data. Display screen 43 has reduction layout display screen 44 for displaying the storage state of memory 3 (e.g., layout display) as a portion thereof when key 15 is depressed. In this embodiment, screen 44 enables 44 columns×30 rows layout display thereon, and other portions of the display data are displayed by scrolling. In screen 44, a position of interest (e.g., a position of a character to be corrected) is indicated by flashing cursor 45, as shown in FIG. 1. Memory 3 can store 44 columns (corresponding to screen 44)×60 rows of data, and addresses 0 to 2,639 are assigned to storage areas thereof. Therefore on screen 44, for example, an address corresponding to data in a 2nd row and a 3rd column is 46. CPU 21 produces a layout display image using register group 22, transfers the display data to memory 41, and causes display 43 through driver 42 to display the data on screen 44.

The overall operation of the apparatus with the above arrangement according to this embodiment will be described. The detailed operation thereof will be described later. The operation on the layout display screen of a wordprocessor will be used for the sake of easy understanding of the present invention. However, the main aspect of the present invention can be considered the same when a document is displayed or when various other data is displayed. A cursor position on the screen to be considered is selected along a horizontal center line of screen 44. However, as will be apparent from the following descriptions, the present invention is not limited to this position.

Assume that part of document data content of the storage area of memory 3 is displayed on screen 43. In this case, layout display key 15 of key input section 1 is operated, CPU 21 determines that input code data is a layout display command, and reduction layout display screen 44 is displayed on display 43. In addition, the cursor is located at a predetermined position on screen 44 (e.g., along the horizontal center line thereof). In this state, when any key of input section 1 is depressed, CPU 21 determines which one of keys 11 to 16 is depressed from the code data. When it is determined as one of keys 13 and 14 for moving the cursor vertically, the cursor position is left unchanged and the displayed data on screen 44 scrolls under the control of controller 2. More specifically, CPU 21 reads out the content of memory 3 using group 22 to move the cursor on the screen or to scroll the displayed data. For example, when cursor-down movement key 13 is operated, a document portion immediately under currently displayed data is read out from the corresponding storage area of memory 3 while the cursor is left unmoved at the center of the screen, and appears from the lower end of screen 44 by scrolling. In this case, controller 2 checks if the corresponding storage area is present in memory 3. If detected, controller 2 performs the above scrolling operation, and if not, the cursor position begins to move from the screen center toward the lower end of the screen. When cursor-up movement key 14 is operated, the operation is just as above except that the moving (or scrolling) direction is reversed. Unless a document to be displayed corresponds to an ending or starting portion of a page, the screen scrolling operation is performed while the cursor remains at the screen center.

When character input key 16 is operated, CPU 21 performs KANA-KANJI conversion, with reference to ROM 5 based on the input character code, so as to store it in a corresponding area in memory 3. In addition, CPU 21 performs display of screen 44 and updating of the cursor position.

The display operation will now be described with reference to FIGS. 2A to 2F, 3, and 4. In this embodiment, the cursor position on screen 44 is selected to be in the 16th (center) line on the screen so as to allow easy comprehension of a display document.

Figure 2E:
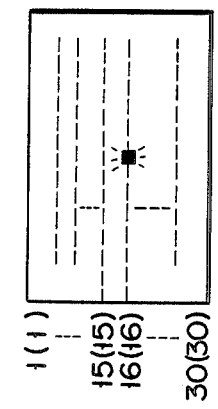
FIGS. 2A to 2F are illustrations showing various display states of the apparatus shown in FIG. 1.
Figure 2F:
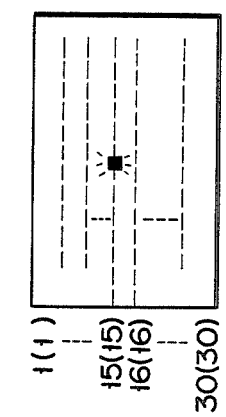

The operation will now be described when cursor-down movement key 13 is depressed. As shown in FIG. 2A, the 10th to 39th lines of the document data in memory 3 is displayed on screen 44, and the cursor is located on the 16th line (i.e., on the 25th line in memory 3). Note that in FIGS. 2A to 2F, numerals in parantheses indicate lines on screen 44, and outside numerals indicate lines in memory 3. In FIG. 2A, register Y for indicating the line (raw) position of the cursor indicates 25, and register SLR indicates 10. When cursor-down movement key 13 of input section 1 is operated in this state, CPU 21 first checks if the input code is a cursor-down movement command. If so detected, the control flow enters step 101 in FIG. 3. In step 102, CPU 21 checks if the content of register Y exceeds 60. Since memory 3 in this embodiment can store up to 60 lines of data and the line of interest is indicated by the cursor, CPU 21 checks if the line of interest corresponds to the last line in the storage area of memory 3. It is determined from the result of step 102 whether the displayed data or the cursor is to be scrolled. In this embodiment, since register Y indicates line 25 (i.e., less than 60), the flow advances to step 103. In step 103, the content of register Y is incremented by one. This means the cursor position shifts from the 25th to 26th line in memory 3. The flow then advances to step 104, and it is checked if the content of register Y exceeds 15. Since screen 44 can display up to 30 lines and the cursor is currently located on the 16th line, it is checked if a storage area for storing document data to be displayed on the 1st line of screen 44 is present in memory 3. In this embodiment, since register Y indicates 26, the flow advances to step 105. It is checked in step 105, just as step 104, if the storage area for storing document data to be displayed on the 30th line of screen 44 is present in memory 3. In this embodiment, since register Y indicates 26, the flow advances to step 106. In step 106, 15 is subtracted from the value of register Y, and the difference is set in register SLR. The content of register Y is unchanged. More specifically, the line number in memory 3 to be displayed on the 1st line on screen 44 is calculated. In this embodiment, since the content of register Y is 26, 11 (=26−15) is set in register SLR. In this way, when the cursor line (26th line) in memory 3 is displayed on the 16th line of screen 44, the 11th line in memory 3 is displayed on the 1st line of screen 44.

For layout display processing of document data on screen 44, steps 107 to 112 are then executed. In step 107, since screen 44 is a 30-line display, 30 is set in work register W. In step 108, since the content of register SLR is now 11, 440 as the 1st-column address of the 11th line in memory 3 is set in register TXADR. In step 109, CPU 21 reads out the content of register TXADR, and accesses memory 3 using it as address data so as to read out 44-column layout data corresponding to data at the 11th line in memory 3, then transferring it to memory 41. In step 110, 44 is added to the content of register TXADR. More specifically, the address for specifying the storage area is incremented by one line. In step 111, since one-line data is displayed, the content of register W is decremented by one. In step 112, it is checked if the content of register W is zero. More specifically, it is checked if all the layout data to be displayed is read out and displayed. If N (NO) in step 112, steps 109 to 112 are repeated. After steps 107 to 112, 30-line layout data from the 11th to 40th line in memory 3 can be transferred to memory 41. The data in memory 41 is displayed on screen 44 by driver 42. As a result, screen 44 changes from FIG. 2A to 2B. In step 113, the cursor is displayed on the 16th line which is determined such that content 11 of register SLR is subtracted from content 26 of register Y and the difference is incremented by one. The cursor position in the column direction is the same as the content of register X. As described above, when cursor-down movement key 13 is operated in the state shown in FIG. 2A, the document scrolls upward by one line while the cursor position is left unchanged on screen 44, as shown in FIGS. 2A and 2B, and the 40th line in memory 3 appears from the lower end of the screen. A change from FIG. 2A to 2B may occur when one of the 17th to 45th lines in memory 3 is displayed at the cursor position (16th line) on screen 44.

The operation will now be described in detail when cursor-up movement key 14 is operated. When cursor-up movement key 14 is operated in the state shown in FIG. 2A, CPU 21 checks, just as with the cursor-down movement key, if the input code is a cursor-up movement command. If so detected, the flow advances to step 117. In this case, it is checked if the content of register Y is larger than 1. This means that CPU 21 checks if the line of interest does not correspond to the 1st line in memory 3. If N in step 117, the screen scrolling operation described hereinafter cannot be performed. Since the content of register Y is 25, the flow advances to step 118. In step 118, the content of register Y is decremented by one to obtain 24. Thereafter, steps 104 to 114 are executed just as when cursor-down movement key 13 is operated. In this way, the displayed document scrolls downward on screen 44 by one line without changing the cursor position.

Figure 2C:
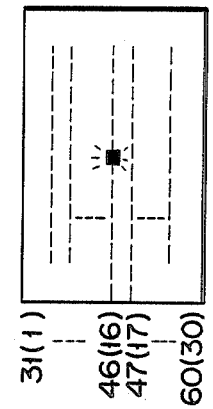
Figure 2D:
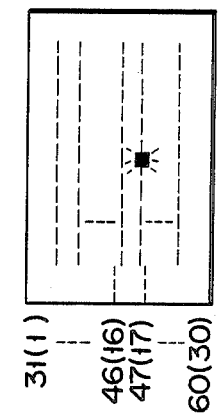
Figure 2A:
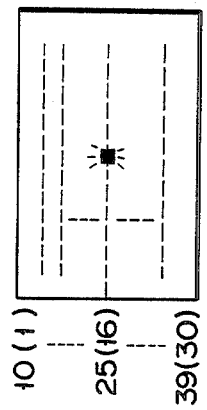
Figure 2B:
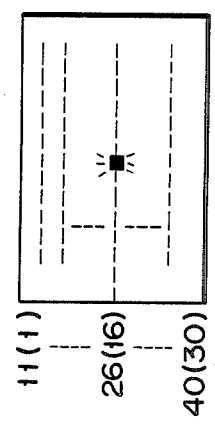
Figure 3:
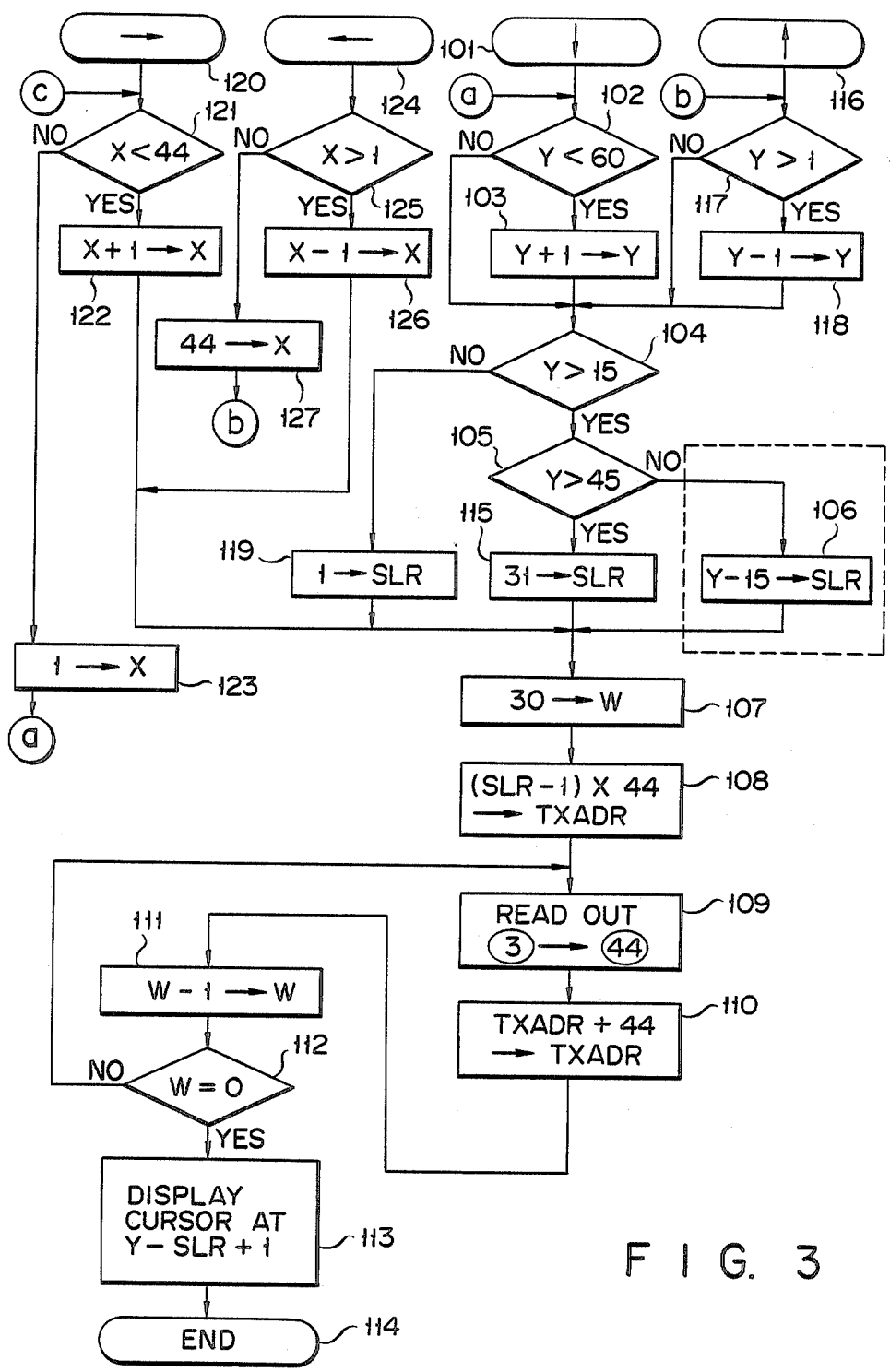
FIG. 3 is a flow chart showing an operation when a cursor movement key is operated if a cursor position to be maintained is selected along a horizontal center line of the screen.

The operation will now be described when the 31st- to 60th-line layout data in memory 3 is displayed on screen 44, as shown in FIG. 2C, i.e, when the cursor is located on the 46th line in memory 3. In this case, the content of register Y is 46 and that of register SLR is 31. When cursor-down movement key 13 is operated in this state, CPU 21 checks if the input code is the cursor-down movement command, in the same manner when key 13 is operated in FIG. 2A. If so detected, since the current content of register Y is 46, steps 101 to 104 are executed, and as a result, that of register Y becomes 47. In step 105, the content of register Y is checked, and since it is larger than 45, the flow advances to step 115. In step 115, 31 is set in register SLR. Therefore, the content of register SLR is left unchanged before and after cursor-down movement key 13 is operated. In this case, since the storage area for storing the 61st line is not present in memory 3, the data displayed on screen 44 cannot scroll. Although steps 107 to 113 are then executed, since the content of regiser SLR is left unchanged until step 115, the displayed data can no longer be scrolled. On the other hand, since the content of register Y is incremented by one in step 103, the cursor position is moved downward by one line in the cursor display mode in step 113, as shown in FIG. 2D. More specifically, when key 13 is operated in the state shown in FIG. 2C, the screen scrolling operation is not performed, and the cursor position is shifted downward. Each time key 13 is operated, the cursor moves downward until it reaches the 60th line. When the cursor position has reached the 60th line, CPU 21 executes steps 102 and 104. As a result, since step 103 is not executed, the content of register Y is not incremented. Therefore, the displayed data is not scrolled, and the cursor remains on the 60th line.

Assume that the 1st- to 30th-line layout data in memory 3 is displayed on screen 44, as shown in FIG. 2E. In this case, the content of register Y is 16, and that of register SLR is 1. When cursor-up movement key 14 is operated in this state, CPU 21 checks the input code, as above. If the cursor-up movement command is detected, steps 116 to 118 are executed, and the content of register Y is decremented by one to obtain 15. Therefore, after step 104, step 119 is executed and 1 is set in register SLR. The content of register SLR for specifying the starting line to be displayed is unchanged before and after cursor-up movement key 14 is operated. Although steps 107 to 112 are executed in order to display data, since the content of register SLR is left unchanged until step 119, the displayed data is not scrolled. On the other hand, since the content of register Y is decremented by one in step 118, the cursor position is shifted upward by one line, as shown in FIG. 2F, when the cursor is displayed in step 113. More specifically, when key 14 is operated in the state shown in FIG. 2E, since no line before the 1st line is present in memory 3, the displayed data cannot be scrolled downward, and the cursor position shifts upward until it reaches the 1st line. When the cursor position has reached the 1st line, CPU 21 executes steps 117 and 104. In this case, since step 118 is not executed, the cursor is retained on the 1st line, just as the case where the cursor is on the 60th line in the display state shown in FIG. 2C.

A case will be described when key 14 is operated in the state shown in FIG. 2D. In this case, the content of register Y is 47, and that of register SLR is 31. When the input code data is determined as the cursor-up movement command, CPU 21 executes steps 116, 117, 118, 104, 105, and 115. As a result, the content of register Y is decremeted by one to obtain 46, and that of register SLR is left unchanged (i.e., 31). Therefore, when steps 107 to 113 are executed, the displayed data is not scrolled and only the cursor shifts upward, as shown in FIG. 2C. When key 13 is operated in the state of FIG. 2F, the displayed data is not scrolled just as above, and only the cursor is moved and is displayed as shown in FIG. 2E.

As described above, when the cursor is located on the 16th line of screen 44, i.e., when the cursor is located on a boundary of a predetermined region on screen 44, if the cursor-up or -down movement command is input, the displayed data is scrolled downward or upward while the cursor remains located at the same position of the screen. Thereby, immediately after a document portion to be corrected is displayed on the center portion of the screen by scrolling, it can be corrected with the cursor. When the last line in memory 3 is displayed on the screen, the cursor position is moved without scrolling the displayed data.

A case will be described when cursor-right movement key 11 is operated in the state shown in FIG. 2A. In this case, the content of register Y is 25, that of register SLR is 10, and that of register X is 20 if the cursor is located near the screen center (e.g., in the 20th column). When key 11 is operated in this case, CPU 21 checks if the input code data is a cursor-right movement command. If so detected, CPU 21 executes step 121 in FIG. 3. It is checked in step 121 if the cursor position on the screen corresponds to the 44th column (i.e., the right end of the screen). In this case, since the content of register X is 20, the flow advances to step 122, and the content of register X is incremented by one. In this case, the contents of registers Y and SLR are left unchanged. Subsequently, steps 107 to 112 are executed. As a result, the displayed data is not scrolled, and the cursor shifts to the right by one column, in step 113.

A case will be described if key 11 is operated when the cursor position corresponds to the 44th column of screen 44. In this case, the content of register X is 44. CPU 21 checks if the input code data is the cursorright movement command. If so detected, CPU 21 executes step 121. Since the content of register X is 44, step 123 is executed after step 121, and 1 is set in register X. Steps 102 to 113 are then executed, depending on the situation. Thereafter, when the data is displayed on screen 44 as shown in FIG. 2A, the displayed data is scrolled upward by one line, and the cursor is displayed at the left end of the 16th line of screen 44. When the data is displayed as shown in FIG. 2C, the displayed data is not scrolled, and the cursor is displayed at the left end of the 17th line of the screen.

A case will be explained when cursor-left movement key 12 is depressed in the state shown in FIG. 2A. In this case, the cursor is located near the screen center (e.g., in the 20th column). More specifically, the content of register X is 20 and CPU 21 checks if the input code data is a cursor-left movement command. If so detected, step 125 is executed, and it is checked if the content of register X is 1, i.e., if the cursor is at the left end of screen 44. In this example, since the content of register X is 20, step 126 is executed, and the content of register X is decremented by one. Thereafter, steps 107 to 113 are executed to display the data and the cursor. In this case, since the contents of registers Y and SLR are left unchanged, the displayed data is not scrolled, and the cursor is shifted not in the vertical direction but to the left by one column.

A case will be explained wherein cursor-left movement key 12 is operated when the cursor is located on the 1st column on screen 44. CPU 21 checks if the input code data is the cursor-left movement command. If so detected, step 127 is executed after step 125, and the content of register X is set to be 44. Thereafter, steps 117 to 113 are executed, depending on the situation. Therefore, when the data is displayed as shown in FIG. 2A, the displayed data is scrolled downward by one line, and the cursor is displayed at the right end of the 16th line of screen 44, i.e., at the right end of the same line on the screen it was on before the command was input. When the data is displayed as shown in FIG. 2E, the displayed data is not scrolled, and the cursor is shifted to the right and is displayed at the right end of the 15th line of screen 44.

Figure 4:
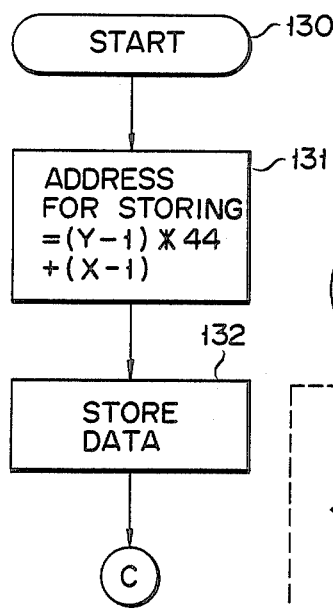
FIG. 4 is a flow chart showing an operation when data is input in the apparatus shown in FIG. 1.

A case will be described, with reference to FIG. 4, when character keys of input section 1 are operated. CPU 21 checks if the input code data is character data. CPU 21 performs KANA-KANJI conversion of the input character data with reference to ROM 5, and then stores it at an address in memory 3 corresponding to the cursor display position. At the same time, CPU 21 determines that the cursor-right movement command is input, and executes step 121. Thereafter, the apparatus is operated just as when cursor-right movement key 11 is depressed.

According to the present invention, since the screen can be scrolled while the cursor is located at the screen center, a displayed document is easy to see.

Figure 5:
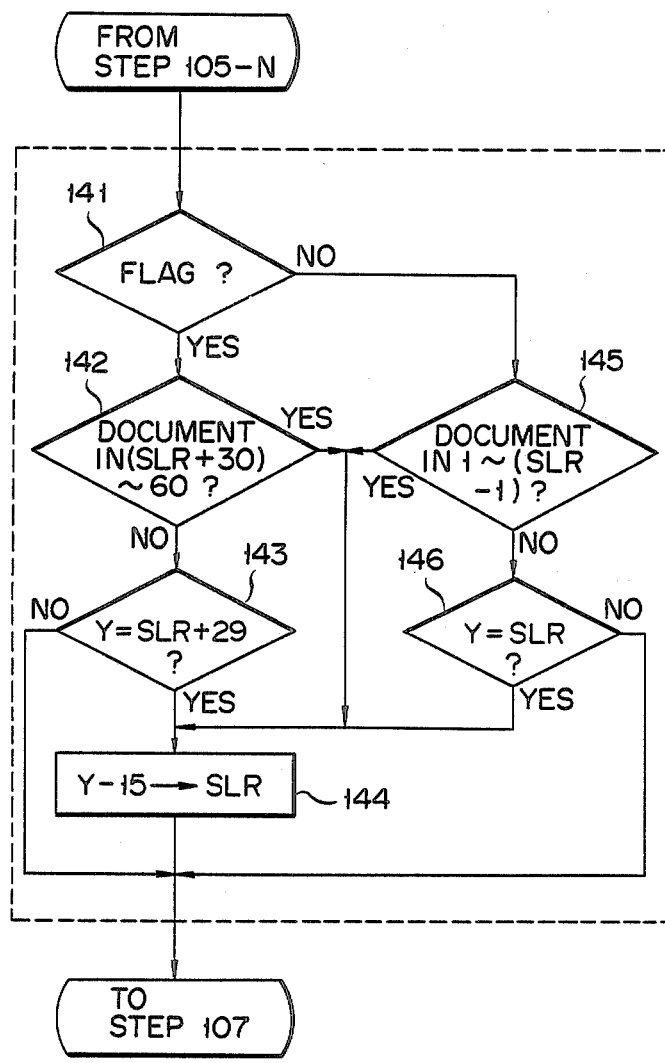
FIG. 5 is a flow chart showing an operation of the apparatus shown in FIG. 1 when a flow chart for discriminating the presence/absence of data to be displayed in a document memory is added to the flow chart shown in FIG. 3.

In the above embodiment, the screen scrolling operation is performed if document data is present in the storage area of the document memory in the cursor moving direction. Even if the storage area to be displayed does not store any data, the screen scrolling operation is preferably interrupted to move the cursor. FIG. 5 is a flow chart of such a situation. This flow chart is executed when N is determined in step 105 in FIG. 3, i.e., when the storage area to be displayed is present. The result from the flow chart in FIG. 5 is accepted in step 107. The contents of registers Y and SLR are not limited to the above ranges in this embodiment, and can be set arbitrarily.

It is checked in step 141 if a down flag is set. More specifically, the down flag is set when the cursor-down movement command is input, and is reset when the cursor-up movement command is input. Assuming that the cursor-down movement command is input, step 142 is executed after step 141, and CPU 21 checks if any document data is stored posterior to the lines in memory 3 corresponding to the lines on screen 44. If Y in step 142, the flow advances to step 144, and the normal screen scrolling operation is performed, just as above, without moving the cursor from the 16th line. However, if N in step 142, the flow advances to step 143, and if the cursor position is not at the lower end of the screen, the flow advances to step 107. Since the content of register SLR is left unchanged and that of register Y is incremented by one, only the cursor position shifts downward by one line without the screen scrolling operation. Even if no document data is stored, when the cursor position is shifted to the lower end of screen 44 after the above operation is repeated, the flow advances from step 143 to step 144, and the displayed data scrolls and leaves the screen line by line.

On the other hand, when the cursor-up movement command is input, since the down flag is reset, step 145 is executed after step 141. In step 145, CPU 21 checks if the document data is stored prior to the line in memory 3 corresponding to the 1st line of screen 44. If Y in step 145, the flow advances to step 144, and the normal screen scrolling operation is performed, just as above, without changing the cursor position on the screen. However, if N in step 145, the flow advances to step 146, and it is checked if the cursor is located at the upper end of screen 44. If N in step 146, the flow advances to step 107. Since only the content of register Y is decremented by one without changing that of register SLR, only the cursor position is shifted upward by one line without performing scrolling the displayed data. Even if no document data is stored, if the cursor position reaches the upper end of screen 44 after the above operation is repeated, the flow advances from step 146 to step 144, and the displayed data is scrolled and leaves the screen line by line, without moving the cursor position on screen 44.

Another embodiment of the present invention will be described with reference to FIG. 6. In this embodiment, when the cursor is located in a predetermined central region separated from the upper and lower borders of the screen by the predetermined number of lines, the cursor moves normally: vertically or horizontally. However, when the cursor is located on the upper or lower boundary, if the cursor-up or -down movement command is input, the screen scrolls without changing the cursor position generally. However, when the same key is repeatedly operated and the document data to be displayed is not in memory 3, the displayed data is not scrolled but the cursor moves toward the upper or lower end of the screen. When the cursor reaches the end of the screen, the screen scrolls without cursor movement. In this embodiment, the predetermined number of lines is 3. Also in this embodiment, registers Y and SLR can take arbitrary values.

Figure 6:
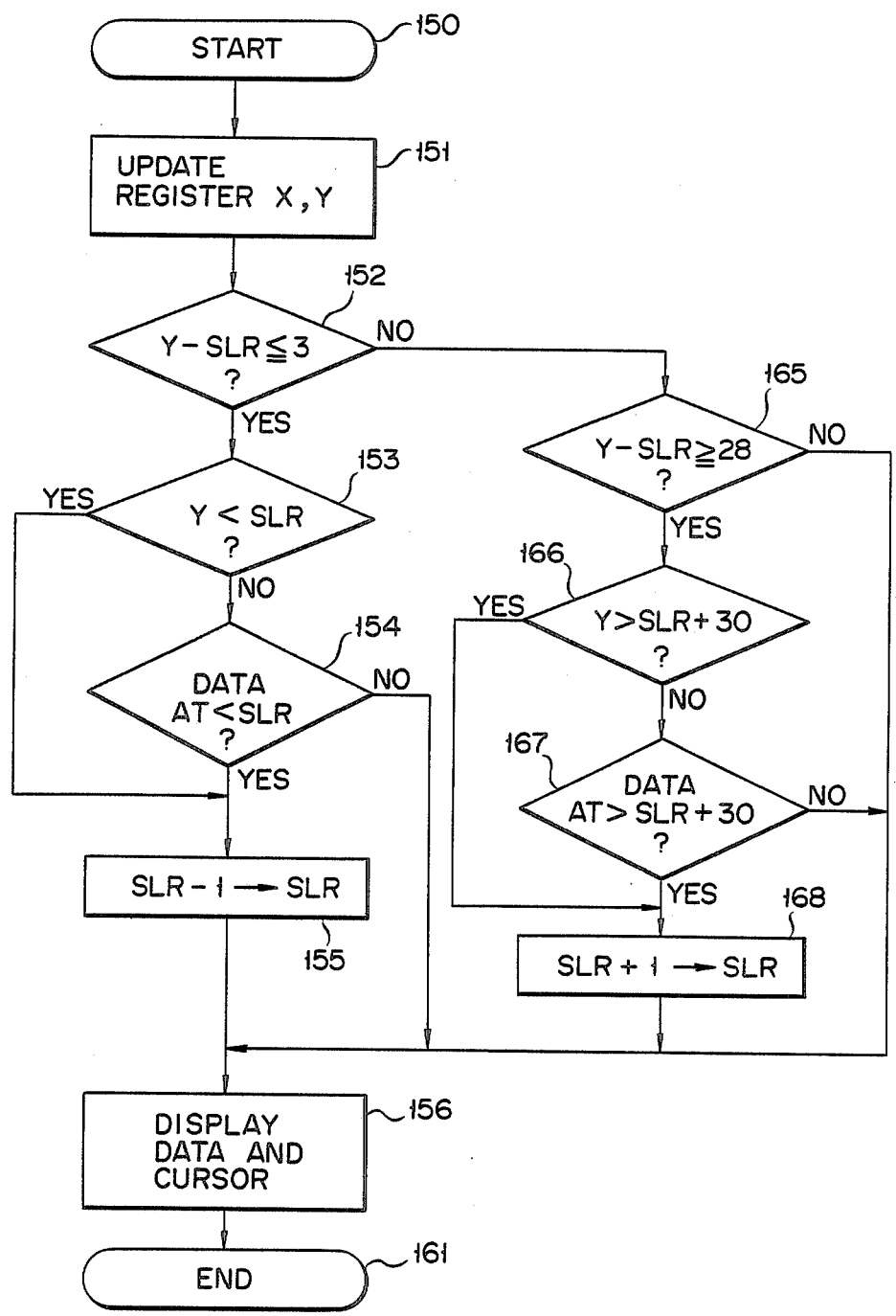
FIG. 6 is a flow chart showing an operation when the cursor position to be maintained is selected in a region sandwiched between horizontal lines respectively separated from upper and lower ends of the screen at a predetermined distance, according to another embodiment of the present invention.

When the cursor-up or -down movement key is operated, processing shown in the flow chart of FIG. 6 is executed, and step 151 follows step 150 so as to update registers X and Y in accordance with the cursor command within the display range. More specifically, when the cursor-up movement command is input, the content of register Y is decremented by one (otherwise, is incremented by one). Thereafter, it is checked in step 152 if the content of register Y is larger than that of register SLR by 3 or less. Assuming that the cursor is located below the 4th line of screen 44 before step 151, the content of register Y is incremented by one in the cursor-down movement mode in step 151, and the difference between the contents of registers Y and SLR exceeds 4, thus executing step 165 after step 152. However, assuming that the cursor is located on the 4th line of screen 44, when the cursor-up movement command is input, the content of register Y is decremented by one. Therefore, the content of register Y becomes 3, and step 153 is executed after step 152.

If the cursor is located above the 2nd line of screen 44, this means that no data is present prior to the address in memory 3 corresponding to the content of register SLR. This fact is used in step 154. If the updated content of register Y is larger than that of register SLR by 3 or less, step 153 is executed, and it is checked if the content of register Y is smaller than that of register SLR. If Y in step 153, i.e., if the cursor is located at the upper end of screen 44 and the cursor-up movement command is input, step 155 is executed, and the content of register SLR is decremented by one. As a result, the content of register Y becomes equal to that of register SLR. Thereafter, in step 156, the content of memory 3 is displayed based on the content of register SLR, and the cursor is displayed, thus ending the processing. Step 156 corresponds to steps 107 to 113 in the first embodiment. In this case, since the content of register SLR is decremented by one, the displayed data is scrolled downward by one line and the cursor position on screen 44 is left unchanged.

If N in step 153, the flow advances to step 154, and it is checked if data to be displayed is present prior to the address in memory 3 corresponding to the content of register SLR. When the cursor is located on the 2nd line of screen 44 in step 150 and the cursor-up movement command is input, since data to be displayed is absent as above, the flow advances from step 154 to step 156, and the cursor shifts in the direction indicated by the command, without scrolling the displayed data. If the cursor is located on the 3rd line of screen 44 in step 150 and data to be displayed is present, step 155 is executed, and the content of register SLR is decremented by one. As a result, the displayed data is scrolled downward, and the cursor position on screen 44 is left unchanged.

If N in step 152, the flow advances to step 165, and it is checked if the difference between the contents of registers Y and SLR is larger than or equal to 28. When the cursor is located between the 5th and 26th lines of the screen in step 150, when the cursor-up movement command is input upon the cursor being located at the 4th line or when the cursor-down movement command is input upon the cursor being located at the 27th line, N is obtained in step 165. The flow then advances to step 156. As a result, the cursor is moved in a direction indicated by the command without scrolling the displayed data.

If Y in step 165, the flow advances to step 166. More specifically, when the cursor is located at the lower end or on the 28th or 29th line of screen 44 and the cursor-down movement command is input, step 166 is executed. In step 166, it is checked in step 166 if the cursor-down movement command is input when the cursor is located on the 30th line of screen 44. In this case, the flow advances to step 168, and the content of register SLR is incremented by one. Thereafter, the flow advances to step 156. Therefore, the displayed data is scrolled upward without changing the cursor position. However, if N in step 166, the flow advances to step 167, and it is checked if data to be displayed is present posterior to the address in memory 3 corresponding to the lowermost line of screen 44. If Y in step 167, steps 168 and 156 are executed, and the displayed data is scrolled upward without changing the cursor position. However, if N in step 167, the flow jumps to step 156, and the cursor is shifted in a direction indicated by the input command without scrolling the displayed data.

The above operation will be summarized with respect to the input data. For example, assume that the storage content of memory 3, in which data to be displayed is present, is displayed on screen 44, and the cursor is located within 24 lines at the center of the screen. In this state, the cursor-up movement command is input. Thereby, although the content of register Y is decremented by one (the content of register X is left unchanged), since the cursor position has not reached the range within 3 lines from the upper or lower ends of the screen, the cursor is successively moved each time the cursor movement key is operated, and reaches the boundary of the predetermined range. In this state, the display controller checks if the displayed data is present in the display memory before the address designated by the content of register SLR. If detected, the controller decrements the content of register SLR by one, and displays the data. Thus, the screen scrolls downward by one line while the cursor position is retained on the 3rd line. When the cursor-up movement command is input consecutively, the same scrolling operation as above is repeated until data to be displayed is absent in the display memory prior to the address designated by the content of register SLR. When data to be displayed is absent, the scrolling operation is interrupted, and the cursor is moved from the 3rd to the 2nd line, and then to the 1st line. When the cursor has reached the uppermost line, the screen scrolls downward and the data leaves the screen line by line from the lower end thereof.

Assume that the cursor-down movement command for moving the cursor downward from the center of the screen is input and the cursor is displayed within the range described above. In this case, the content of register Y is incremented by one, and the cursor is moved downward on the screen. When the cursor has reached the boundary of the 3-line range, display controller 2 checks if displayed data is present on the line in memory 3 corresponding to the content of register SLR+30. If so detected, the content of register SLR is incremented by one, and the detected data is displayed. Thus, the displayed data is scrolled upward by one line while the cursor position is retained on the 28th line of the screen. When the cursor is consecutively moved downward, the same scrolling operation as above is repeated until the displayed data on the line in memory 3 corresponding the content of register SLR+30 is absent. When the displayed data is absent, the scrolling operation is interrupted, and the cursor is moved from the 28th line to the 29th line. When the cursor has reached the lowermost end of the screen, the displayed data is scrolled upward again and leaves the upper end of the screen line by line.

When the cursor-up or -down movement key is operated, the cursor moves freely within the range of the central 24 lines, and when it reaches 3rd line from the upper or lower end of the screen, the displayed data is scrolled downward or upward while the cursor is retained at that position. Thus, even if the cursor is not moved fully to the end of the screen, the screen scrolling operation can be performed, thus allowing the easy comprehension of the document. In addition, at this cursor position, a document can be corrected immediately. In this embodiment, the cursor moving range is the central 24 lines, but it is obvious that it can be set arbitrarily.

According to the above embodiments, displayed data can be scrolled while the cursor is located at a central position of the screen and is easy to see, making it easy to see an entire document.

In the above embodiments, the present invention is applied to a reduction layout screen display in a Japanese wordprocessor or the like, but can be applied to a normal screen display. In addition, a means for indicating a position of interest is not limited to a cursor but can be other characters, symbols, numerals, or the like. In the above embodiments, all the data in the column direction of the document memory can be displayed. However, data in the column direction can be partially displayed so as to allow a horizontal scrolling operation as well as the vertical scrolling operation describled above. Furthermore, when displayed data is scrolled, the cursor position is maintained at the center of the reduction layout screen, but the position can be selected as needed. When horizontal or vertical margins are set, cursor movement or screen scrolling can be performed within the range of margins.

What is claimed is:

1. A display apparatus which can scroll displayed data in response to a cursor position command, comprising:

storage means for storing data to be displayed over a plurality of lines;

display means for reading out an amount of stored data from said storage means for display on a screen having a certain line display range with line numbers increasing from top to bottom, and for displaying the readout data as display data within the line display range of the screen, together with a cursor mark which indicates a position where correction of the display data may be made;

input means for inputting cursor movement commands including a down-movement command and an up-movement command for the cursor mark;

cursor position-detecting means for determining if the cursor mark is displayed in a predetermined narrow screen region which is located at approximately the middle of said screen, in response to a cursor movement command entered by said input means;

first data detecting means for determining if said storage means contains data for display at lines exceeding the greatest line of data displayed within the display range of said screen when said cursor position-detecting means determines that the cursor mark is currently positioned in the predetermined narrow screen region and said input means enters a down-movement command;

down movement-controlling means responsive to said first data detecting means for maintaining the cursor mark at the current position, and for scrolling up on said screen the data read out from said storage means and displayed on said screen by one line if said storage means stores data at lines exceeding the greatest line of data currently displayed on said screen, and for maintaining the current display of lines of data fixed on the screen and moving the cursor mark position down by one line if no data is stored in said storage means at lines exceeding those currently displayed;

second data detecting means for determining if said storage means contains data for display at lines less than the least line of data displayed within the display range of said screen when said cursor position-detecting means determines that the cursor mark is currently positioned in the predetermined narrow screen region and said input means enters an up-movement command; and up movement-controlling means responsive to said second data detecting means for maintaining the cursor mark at the current position and for scrolling down on said screen the data read out from said storage means and displayed on said screen by one line if said storage means stores data at lines less than the least line of data currently displayed on said screen, and for maintaining the current display of lines of data fixed on the screen and moving the cursor mark position up by one line if no data is stored in said storage means at lines less than those currently displayed.

2. The apparatus according to claim 1, wherein said down-movement controlling means comprises means for maintaining the current display of lines of data fixed on the screen and moving the cursor mark position down by one line in response to said down-movement command, if said cursor position-detecting means detects that the cursor mark is positioned outside the predetermined narrow screen region.

3. The apparatus according to claim 1, wherein said up movement-controlling means comprises means for maintaining the current display of lines of data fixed on the screen and moving the cursor mark position up by one line in response to said up movement command, if said cursor position-detecting means detects that the cursor mark is positioned outside the predetermined narrow screen region.

4. The apparatus according to claim 1, wherein the predetermined narrow screen region is located along a horizontal screen line dividing said screen into two equal upper and lower portions.

5. The apparatus according to claim 1, wherein the predetermined narrow screen region is bounded by lines separated from upper and lower ends of said screen at respective predetermined intervals.

6. A method of controlling a display apparatus which reads out display data for display on a screen having a certain line display range, from a memory storing a number of lines of document data, and which apparatus displays the readout data on the display screen, together with a cursor, comprising the steps of:

(a) maintaining the data read out from the memory on the screen and moving the cursor down by one line, when the cursor is positioned above a first predetermined line which is located at approximately the middle of the screen and when a cursor down-movement command is input;

(b) repeating step (a) until the cursor is positioned at the first predetermined line;

(c) maintaining the cursor fixed in position at the first predetermined line and scrolling up on the screen the data read out from the memory by one line, when the cursor is positioned at the first predetermined line, a cursor down-movement command is input, and document data at lines exceeding currently displayed data is present in the memory;

(d) maintaining the currently displayed data fixed on the screen and moving the cursor down by one line, when no document data at lines exceeding the currently displayed data is present in the memory and the cursor down-movement command is input;

(e) maintaining currently displayed data fixed on the screen and moving the cursor up by one line, when the cursor is positioned below a second predetermined line which is located above said first predetermined line and approximately at the middle of the screen, and a cursor up-movement command is input;

(f) repeating step (e) until the cursor is positioned at the second predetermined line;

(g) maintaining the cursor fixed in position at the second predetermined line and scrolling down on the screen the data read out from the memory by one line, when the cursor is positioned at the second predetermined line, a cursor up-movement command is input, and document data at lines less than the currently displayed data is present in the memory; and (h) maintaining the currently displayed data fixed on the screen and moving the cursor up by one line, when no document data at lines less than the currently displayed data is present in the memory and the cursor up-movement command is input.

7. A method of controlling a display apparatus which reads out display data for display on a screen having a certain line display range including an upper display line and a lower display line, from a memory storing a number of lines of document data, and which apparatus displays the read out data on the screen, together with a cursor, comprising the steps of:

(a) maintaining the data read out from the memory fixed on the screen and moving the cursor down by one line, when data corresponding to an uppermost line of the document data stored in the memory is displayed on the screen and a cursor down-movement command is input;

(b) repeating step (a) until the cursor is positioned at a predetermined line which is located at approximately the middle of the screen;

(c) maintaining the cursor fixed in position at the predetermined line and scrolling up on the screen the data read out from the memory by one line, when the cursor is positioned at the predetermined line and the cursor down-movement command is input;

(d) repeating step (c) until data corresponding to a lowermost line of the document data stored in the memory is displayed on the screen;

(e) maintaining the display data read out from the memory fixed on the screen and moving the cursor down by one line, when the lowermost line data is displayed on the screen and the cursor down-movement command is input;

(f) repeating step (e) until the cursor is positioned at the lower display line of the screen;

(g) maintaining the display data fixed on the screen and moving the cursor up by one line, when the lowermost line data is displayed on the screen and a cursor up-movement command is input;

(h) repeating step (g) until the cursor is positioned at the predetermined line;

(i) maintaining the cursor fixed in position at the predetermined line and scrolling the display data down by one line, when the cursor is positioned at the predetermined line and the cursor up-movement command is input;

(j) repeating step (i) until the uppermost line data in the memory is displayed on the screen;

(k) maintaining the display data fixed on the screen and moving the cursor up by one line when the uppermost line data is displayed on the screen and the cursor up-movement command is input; and (l) repeating step (k) until the cursor is positioned at the upper display line of the screen.

* * * * *